US007424436B2

(12) United States Patent
Katikaneni et al.

(10) Patent No.: US 7,424,436 B2
(45) Date of Patent: *Sep. 9, 2008

(54) MAILING SYSTEM HAVING FLEXIBLE PRINTING OF MESSAGES

(75) Inventors: Venkata Katikaneni, Edison, NJ (US); Angelo N Chaclas, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 785 days.

This patent is subject to a terminal disclaimer.

(21) Appl. No.: 09/973,458

(22) Filed: Apr. 3, 2001
(Under 37 CFR 1.47)

(65) Prior Publication Data

US 2002/0073052 A1 Jun. 13, 2002

Related U.S. Application Data

(63) Continuation of application No. 09/470,611, filed on Dec. 22, 1999, now Pat. No. 6,356,883.

(51) Int. Cl.
*G06Q 10/00* (2006.01)
*G06F 17/00* (2006.01)

(52) U.S. Cl. .......................................... 705/1; 705/401

(58) Field of Classification Search ................... 101/71; 283/71; 705/401, 408, 410, 1
See application file for complete search history.

(56) References Cited

U.S. PATENT DOCUMENTS 4,097,923 A 6/1978 Eckert, Jr. et al. ........... 364/900
4,511,793 A 4/1985 Racanelli ..................... 235/375
4,725,718 A * 2/1988 Sansone et al. ............. 235/495
4,831,554 A * 5/1989 Storace et al. .............. 705/403
4,978,114 A * 12/1990 Holbrook ..................... 271/35
5,024,153 A * 6/1991 Bannister et al. .............. 101/91
5,168,804 A * 12/1992 Lee et al. ...................... 101/99
5,454,038 A * 9/1995 Cordery et al. ............... 705/60

(Continued)

FOREIGN PATENT DOCUMENTS

EP 0807916 A1 * 11/1997

(Continued)

OTHER PUBLICATIONS

Dougherty: "Advertising: Postage Stamp as AD Medium"; New York Times Feb 14, 1986, col. 1, p. 15, sectio 4 (Abstract Only).*

(Continued)

*Primary Examiner*—John W Hayes
*Assistant Examiner*—Rob Wu
(74) *Attorney, Agent, or Firm*—George M. Macdonald; Angelo N. Chaclas

(57) ABSTRACT

A postage printing system includes a transport device for feeding an envelope in a path of travel through the postage printing system, a printer for printing a postal indicia and an ad slogan on the envelope, and a control system in operative communication with the transport device and the printer. The control system obtains an indication from an operator of a selected print location for the ad slogan and determines if the postal indicia and the ad slogan may be printed in a single pass through the postage printing system.

15 Claims, 6 Drawing Sheets

U.S. PATENT DOCUMENTS

| | | | | |
|---|---|---|---|---|
| 5,493,106 | A * | 2/1996 | Hunter | 235/375 |
| 5,509,109 | A * | 4/1996 | Kim et al. | 358/1.15 |
| 5,539,190 | A | 7/1996 | Manduley | 235/380 |
| 5,707,158 | A * | 1/1998 | Hansel et al. | 400/61 |
| 5,717,597 | A * | 2/1998 | Kara | 705/408 |
| 5,748,484 | A * | 5/1998 | Cannon et al. | 700/233 |
| 5,749,078 | A | 5/1998 | Gargiulo et al. | 705/404 |
| 5,978,781 | A * | 11/1999 | Sansone | 705/408 |
| 6,010,069 | A | 1/2000 | Debois | 235/380 |
| 6,039,257 | A | 3/2000 | Berson et al. | 235/468 |
| 6,141,654 | A * | 10/2000 | Heiden et al. | 705/408 |
| 6,154,733 | A * | 11/2000 | Pierce et al. | 705/408 |
| 6,173,274 | B1 * | 1/2001 | Ryan, Jr. | 705/408 |
| 6,234,694 | B1 * | 5/2001 | Brookner | 400/76 |
| 6,249,777 | B1 | 6/2001 | Kara et al. | 705/404 |
| 6,389,327 | B1 * | 5/2002 | Thiel | 700/227 |
| 6,698,953 | B1 * | 3/2004 | Hertlein | 400/103 |
| 6,982,808 | B1 * | 1/2006 | Ogg et al. | 358/1.18 |
| 2002/0026430 | A1 | 2/2002 | Ryan, Jr. | 705/404 |

FOREIGN PATENT DOCUMENTS

| | | | |
|---|---|---|---|
| FR | 2720180 | A1 * | 11/1995 |
| WO | WO 98/14909 | | 4/1998 |
| WO | WO 99/44174 | * | 2/1999 |

OTHER PUBLICATIONS

Scisco: "Making labels with a computer"; Office Systems, Mar. 1999, vol. 16, No. 3, pp. 34-37.*

"Webster's Ninth New Collegiate Dictionary", Copyrighted 1986 by Merriam-Webster Inc. Publishers, Springfield, Massachusetts, pp. 203, 949.*

"USe bar codes to automate data entry in VB apps", Murdoch, John, Data Based Advisor, v13, n6, p. 128(5).*

Pavely: "Mail superiority"; Office Systems, Jun. 1995, vol. 12, No. 6, pp. 42-45.

Arar: "Internet Postage Saves Time and Shoe Leather. (Hardware Review)(Evaluation)"; PC World, Apr. 1999, vol. 17, No. 4, p. 94.

* cited by examiner

MAILING SYSTEM HAVING FLEXIBLE PRINTING OF MESSAGES

CROSS REFERENCE TO RELATED APPLICATIONS

This application is a continuation of U.S. patent application Ser. No.: 09/470,611 filed Dec. 22, 1999, now U.S. Pat. No. 6,356,883.

This application is related to the following co-pending applications filed On Dec. 30, 1998 and commonly assigned to the assignee of this application: U.S. patent application Ser. No. 09/224,256, entitled POSTAGE PRINTING SYSTEM HAVING SUBSIDIZED PRINTING OF THIRD PARTY MESSAGES now issued as U.S. Pat. No. 6,141,654; U.S. patent application Ser. No. 09/223,504, entitled POSTAGE PRINTING SYSTEM HAVING VARIABLE SUBSIDIES FOR PRINTING OF THIRD PARTY MESSAGES now issued as U.S. Pat. No. 6,154,733 and U.S. patent application Ser. No. 09/223,643, entitled PRODUCTION MAIL SYSTEM HAVING SUBSIDIES FOR PRINTING OF THIRD PARTY MESSAGES ON MAILPIECES now issued as U.S. Pat. No. 6,173,274, all of which are specifically incorporated herein by reference.

FIELD OF THE INVENTION

This invention relates generally to postage printing systems. More particularly, this invention is directed to a mailing system including a transport system for feeding envelopes in a path of travel, a printer for printing both postage and third party messages, and a control system for coordinating the feeding and printing of third party messages according to user defined parameters.

BACKGROUND OF THE INVENTION

Postage printing systems are well known in the art. A typical postage meter (one example of a postage accounting system) stores and dispenses postage. Evidence that postage has been dispensed is most often in the form of a postal indicia that is printed on an envelope or other mailpiece. As is well known, postage meters include an ascending register, that stores a running total of all postage dispensed by the meter, and a descending register, that holds the remaining amount of postage credited to the meter and that is reduced by the amount of postage dispensed during a transaction. The postage meter generally also includes a control sum register that provides a check upon the descending and ascending registers. The control sum register has a running account of the total funds having been added into the meter. The control sum register must always correspond with the summed readings of the ascending and descending registers. Thus, the control sum register is the total amount of postage ever put into the machine and it is alterable only when adding funds to the meter. In this manner, by inspecting the various registers and securing them from tampering, the dispensing of postal funds may be accurately recorded, tracked and accounted for.

More recently, postage printing systems have been developed where the accounting structure described above is no longer resident with the user and the printing portion of the postage printing system. Sometimes referred to as a "virtual postage meter", these types of postage printing systems dispense postage electronically over suitable communication channels (LAN, WAN, telephone lines, Internet, etc.). The user maintains an account with a remotely located data center (maintained by an authorized postage meter manufacturer) and receives postage securely using appropriate electronic data interchange techniques. At a later time, the user is invoiced for the amount of postage dispensed and any other fees associated with maintaining the account with the data center. Oftentimes, a secret code or token is derived from information particular to the mailpiece (the indicated postage amount, date, recipient address information, etc.) and is incorporated or embedded into the postal indicia for later use by a postal authority in verifying the integrity of the postal indicia. Examples of such systems are described in U.S. Pat. No. 4,725,718 and U.S. Pat. No. 5,454,038.

Generally, the postage metering functionality may also be integrated within a mailing machine. Mailing machines, also well known in the art, are typically employed to automate the handling of the mailpieces so as to increase the efficiency of producing large batches of mailpieces. Mailing machines are readily available from manufacturers such as Pitney Bowes Inc. of Stamford, Conn., USA and often include a variety of different labor saving modules. The typical mailing machine may includes a variety of different modules or sub-systems where each module performs a different task on the mailpiece, such as: singulating (separating the mailpieces one at a time from a stack of mailpieces), weighing, sealing (wetting and closing the glued flap of an envelope), applying evidence of postage, accounting for postage used (performed by the postage meter), feeding roll tape or cut tape strips for printing and stacking finished mailpieces. However, the exact configuration of each mailing machine is particular to the needs of the user. Customarily, the mailing machine also includes a transport apparatus, which feeds the mailpieces in a path of travel through the successive modules of the mailing machine.

It is also known to print selected messages (sometimes referred to as ad slogans although such messages are not necessarily restricted to advertisements) along with the postal indicia. In traditional systems employing either rotary drum or flat bed printing technology, the message is printed along with the postal indicia by including an additional printing die representative of the message. These dies are typically costly to manufacture, difficult to distribute and cumbersome to remove or install. Also, due to physical space requirements, there are practical limits as to the number of message dies that are readily available for printing. Examples of die based systems for printing messages are disclosed in U.S. Pat. No. 5,168,804 and U.S. Pat. No. 5,024,153. More recently, the industry has begun to incorporate digital (dot matrix) printing technology which obviates the need for dies as the digital printer may be supplied with suitable drive signals to effect printing of the message. Thus, a graphical representation of the message may be stored in memory and used by a digital printer to print the message. Examples of digital printing technology based systems for printing messages are disclosed in U.S. Pat. No. 4,831,554 and U.S. Pat. No. 5,509,109.

Although such prior art postage printing systems described above work generally well, they suffer from certain drawbacks and disadvantages. First, the ad slogan and the postal indicia bear a fixed spatial relationship in that the ad slogan appears to the immediate left of the postal indicia. Thus, the operator does not have much flexibility over the location of the ad slogan. Only by adjusting the location of the postal indicia does the ad slogan move in kind. Second, when dedicated printers are employed, the print swath is typically only as wide as the postal indicia. Thus, there is no ability to print the ad slogan in a print swath coincident with the postal indicia.

Therefore, there is a need for an improved postage printing system that allows the operator more flexibility and options for locating the ad slogan with respect to the postal indicia. More particularly, there is a need for a cost effective system that accommodates such flexibility in a reliable manner.

SUMMARY OF THE INVENTION

The present invention provides a system and method for improving the flexibility of printing ad slogans on envelopes. Generally, this is accomplished by having the operator indicate a selected print location for the ad slogan and feeding the envelope through the postage printing system a second time, if necessary, to print the ad slogan in the selected print location.

In accordance with the present invention, there is provided a postage printing system including a transport device for feeding an envelope in a path of travel through the postage printing system, a printer for printing a postal indicia and an ad slogan on the envelope, and a control system in operative communication with the transport device and the printer. The control system obtains an indication from an operator of a selected print location for the ad slogan and determines if the postal indicia and the ad slogan may be printed in a single pass through the postage printing system.

In accordance with the present invention, a method of operating a postage printing system is also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
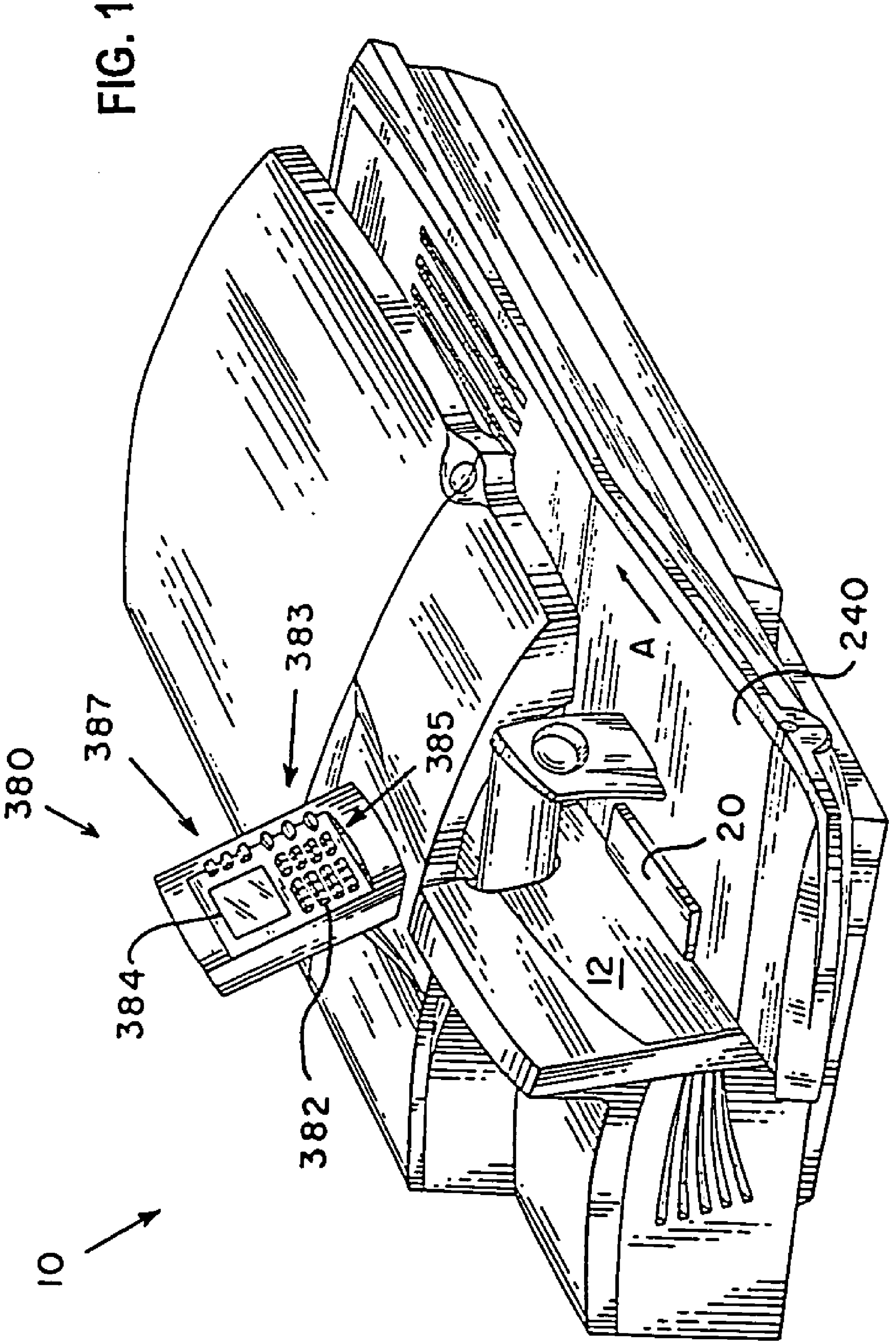
FIG. 1 is a perspective view of a postage printing system in which the present invention may be incorporated.
Figure 2:
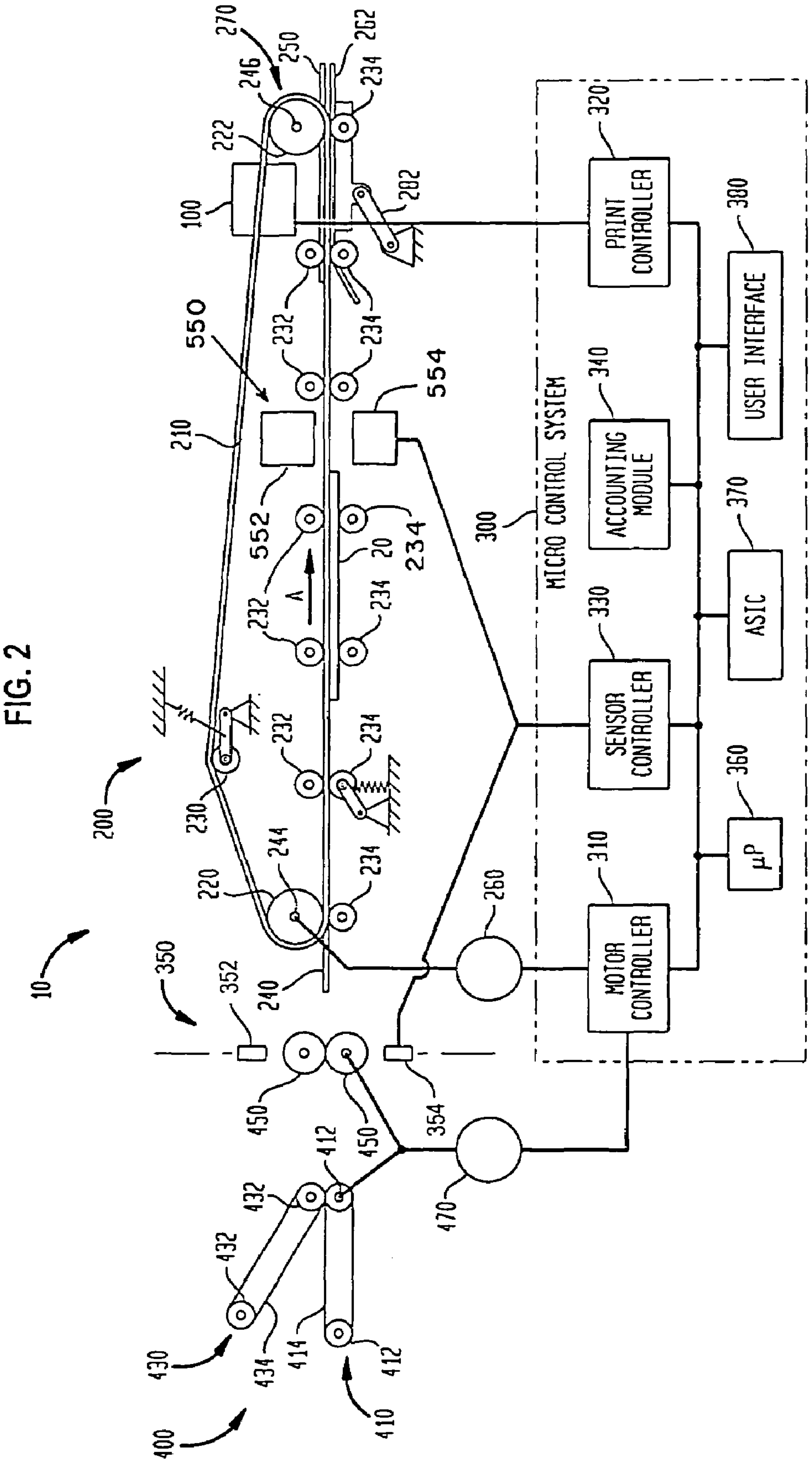
FIG. 2 is a simplified schematic of a front elevational view of the postage printing system in incorporating the present invention.

Referring to FIG. 1, an example of a postage printing system 10, indicative of one example of mailing machine, in which the present invention may be incorporated is shown. Referring to FIGS. 1 and 2, the postage printing system 10 includes a printer module 100, a conveyor apparatus 200, a micro control system 300, a singulator module 400 and a user interface 380 for providing communication between an operator and the postage printing system 10. Other modules of the postage printing system 10, such as those described above, have not been shown for the sake of clarity. The singulator module 400 receives a stack of envelopes (not shown), or other mailpieces such as postcards, folders and the like, and separates and feeds them in seriatim fashion (one at a time) in a path of travel as indicated by arrow A. Generally, a top edge (not shown) of the envelope 20 is aligned with a registration wall 12 so that postal indicia (not shown) and ad slogans (not shown) that are subsequently printed are not skewed on the envelope 20. The conveyor apparatus 200 feeds the envelopes 20 in the path of travel along a deck 240 past the printer module 100 so that a postal indicia can be printed on each envelope 20. Together, the singulator module 400 and the conveyor module 200 make up a transport apparatus for feeding the envelopes 20 through the various modules of the postage printing system 10.

The micro control system 300 may be of any suitable combination of microprocessors, firmware and software. The micro control system 300 includes a motor controller 310 which is in operative communication with the motors 260 and 470, a printer controller 320 which is in operative communication with a printer module 100, a sensor controller 330 which is in operative communication with a sensor module 350 and a scanner module 550; an accounting module 340 for authorizing and accounting for the dispensing of postal funds; a microprocessor 360; and the user interface 380. The motor controller 310, the printer controller 320, the sensor controller 330, the accounting module 340 and other various components of the micro control system 300 are all in operative communication with each other over suitable communication lines. Generally, the microprocessor 360 coordinates the operation and communications between the various modules of the postage printing system 10 and the components of the micro control system 300.

The singulator module 400 includes a feeder assembly 410 and a retard assembly 430 which work cooperatively to separate a batch of envelopes (not shown) and feed them one at a time to a pair of take-away rollers 450. The feeder assembly 410 includes a pair of pulleys 412 having an endless belt 414 extending therebetween. The feeder assembly 410 is operatively connected to a motor 470 by any suitable drive train which causes the endless belt 414 to rotate clockwise so as to feed the envelopes in the direction indicated by arrow A. The retard assembly 430 includes a pair of pulleys 432 having an endless belt 434 extending therebetween. The retard assembly 430 is operatively connected to any suitable drive means (not shown) which causes the endless belt 434 to rotate clockwise so as to prevent the upper envelopes in the batch of envelopes from reaching the take-away rollers 450. In this manner, only the bottom envelope in the stack of envelopes advances to the take-away rollers 450. Those skilled in the art will recognize that the retard assembly 430 may be operatively coupled to the same motor 470 as the feeder assembly 410.

Since the details of the singulator module 400 are not necessary for an understanding of the present invention, no further description will be provided. However, an example of a singulator module suitable for use in conjunction with the present invention is described in U.S. Pat. No. 4,978,114, entitled REVERSE BELT SINGULATING APPARATUS, the disclosure of which is specifically incorporated herein by reference.

The take-away rollers 450 are located adjacent to and downstream in the path of travel from the singulator module 400. The take-away rollers 450 are operatively connected to motor 470 by any suitable drive train (not shown). Generally, it is preferable to design the feeder assembly drive train and the take-away roller drive train so that the take-away rollers 450 operate at a higher speed than the feeder assembly 410. Additionally, it is also preferable that the take-away rollers 450 have a very positive nip so that they dominate control over the envelope 20. Consistent with this approach, the nip between the feeder assembly 410 and the retard assembly 430 is suitably designed to allow some degree of slippage.

The postage printing system 10 further includes a sensor module 350 and a scanning module 550. The sensor module 350 is substantially in alignment with the nip of take-away rollers 450 for detecting the presence of the envelope 20. Preferably, the sensor module 350 is of any conventional optical type, which includes a light emitter 352 and a light detector 354. Generally, the light emitter 352 and the light detector 354 are located in an opposed relationship on opposite sides of the path of travel so that the envelope 20 passes therebetween. By measuring the amount of light that the light detector 354 receives, the presence or absence of the envelope 20 can be determined. Generally, by detecting the front running (furthest downstream) and lagging (furthest upstream) edges of the envelope 20, the sensor module 350 provides signals to the micro control system 300 which are used to determine the length of the envelope 20 and measure the gap between successive envelopes 20. Other purposes will be described in greater detail below.

The scanning module 550 is substantially aligned along the path of travel and locates previously printed images on the envelope 20. Preferably, the scanning module 550 is of any conventional type, such a laser imaging system or a charge couple device (CCD) array. The scanning module 550 includes a first scanner 552 and a second scanner 554 located in opposed relationship on opposite sides of the path of travel so that the envelope 20 passes therebetween. By scanning the front surface of the envelope 20 with the first scanner 552 and the rear surface of the envelope 20 with the second scanner 554, the presence or absence of printed images on the envelope 20 may be determined. Further details above the operational characteristics of the scanner module 550 will be provided below.

The conveyor apparatus 200 includes an endless belt 210 looped around a drive pulley 220, an encoder pulley 222 which is located downstream in the path of travel from the drive pulley 220 and proximate to the printer module 100 and an encoder system 270 operatively coupled to the encoder pulley 222. The drive pulley 220 and the encoder pulley 222 are substantially identical and are fixably mounted to shafts 244 and 246, respectively, which are in turn rotatively mounted to any suitable structure (not shown) such as a frame. The drive pulley 220 is operatively connected to a motor 260 by any conventional means such as intermeshing gears (not shown) or a timing belt (not shown) so that when the motor 260 rotates in response to signals from the micro control system 300, the drive pulley 220 also rotates which in turn causes the endless belt 210 to rotate and advance the envelope 20 along the path of travel.

The conveyor apparatus 200 further includes a plurality of idler pulleys 232, a plurality of normal force rollers 234 and a tensioner pulley 230. The tensioner pulley 230 is initially spring biased and then locked in place by any conventional manner such as a set screw and bracket (not shown). This allows for constant and uniform tension on the endless belt 210. In this manner, the endless belt 210 will not slip on the drive pulley 220 when the motor 260 is energized and caused to rotate. The idler pulleys 232 are rotatively mounted to any suitable structure (not shown) along the path of travel between the drive pulley 220 and the encoder pulley 222. The normal force rollers 234 are located in opposed relationship and biased toward the idler pulleys 232, the drive pulley 220 and the encoder pulley 222, respectively. For clarity, only one of the idler pulleys 232 has been shown with the biasing structure.

As described above, the normal force rollers 234 work to bias the envelope 20 up against the deck 240. This is commonly referred to as top surface registration, which is beneficial for ink jet printing. In the area of the print module 100, a registration shield 250 and a registration ski 262, the details of which are provided below, are utilized to define the print gap between the top surface of the envelope 20 and the array of nozzles (not shown). The conveyor apparatus 200 feeds the envelope 20 so that it passes between the registration shield 250 and the registration ski 262. The registration shield 250 is fixably mounted to any suitable structure such as a frame (not shown). On the other hand, the registration ski 262 is pivotably mounted along its span to one end of a ski arm 282 while the other end of the ski arm 282 is pivotably mounted to any suitable structure such as a frame (not shown). A torsion spring (not shown) biases the registration ski 262 upward toward the registration shield 250. In this manner, any variation in thickness of the envelope 20 is taken up by the deflection of the normal force rollers 234 and the registration ski 262. Thus, a constant print gap is set between the envelope 20 and the printer module 100 no matter what the thickness of the envelope 20. The constant print gap is optimally set to a desired value to achieve quality printing. It is important to note that the deck 240 contains suitable openings (not shown) for the endless belt 210 and normal force rollers 234.

The user interface 380 includes a numeric keypad 382, a set of keys 383, a display 384 (CRT, LED, LCD, or otherwise), a set of function keys 385 and a set of menu keys 387. The keys 383 provide access to a set of "soft" commands or functions, such as: enter, clear, download postage, generate report, account setup, diagnostics and the like. By soft commands, it is meant that these commands are not directly related to processing a batch of mailpieces. In contrast, the function keys 385 provide access to a set of "hard" commands, such as: start, stop, print tape, reset batch counter, weigh mode on/off, sealer/moistener mode on/off and the like, which are directly related to processing a batch of mailpieces. The menu keys 387 are aligned with a portion of the display 384 so as to facilitate the selection of various menus and options by the operator.

Figure 3:
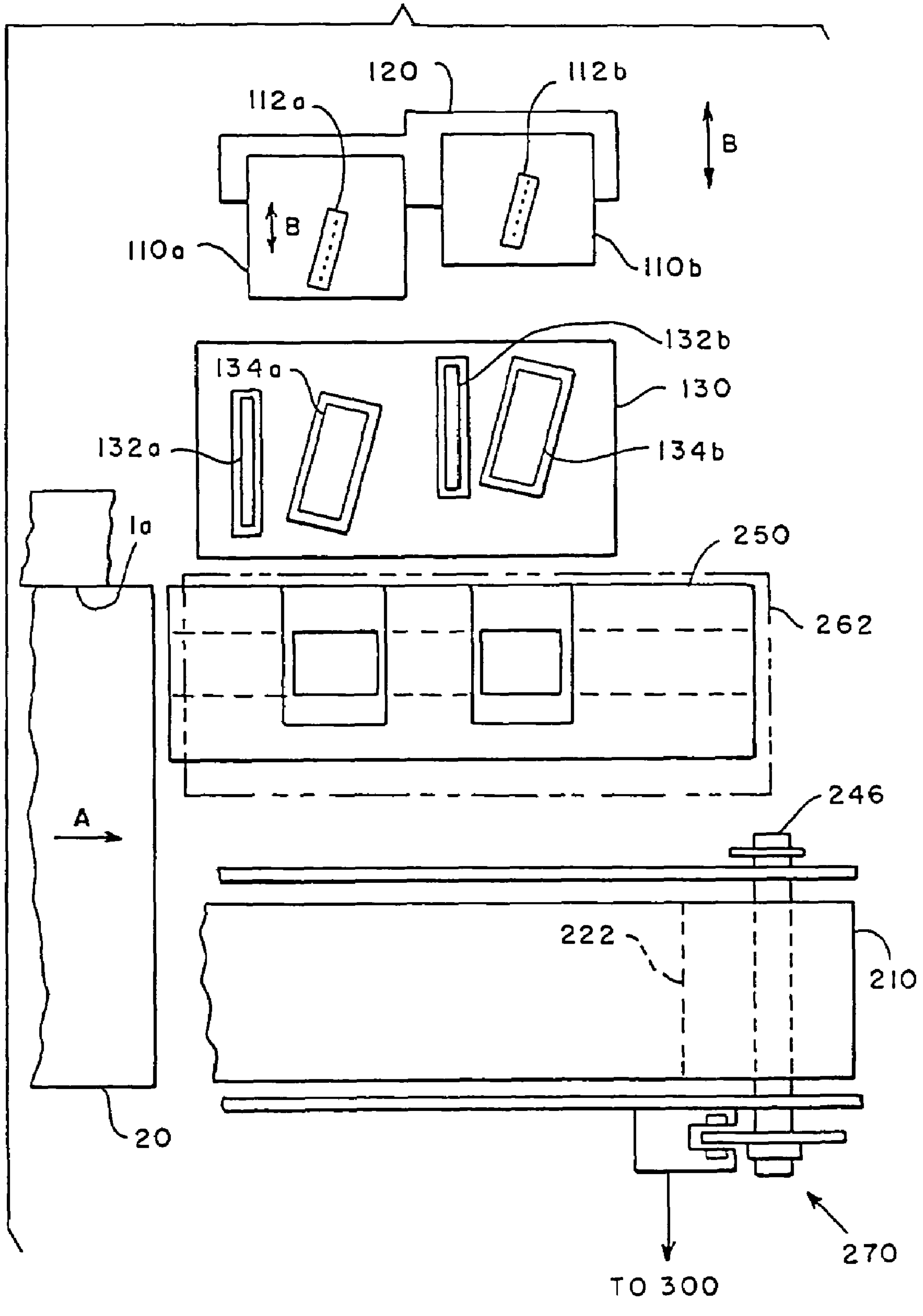
FIG. 3 is a simplified schematic representation of a plan view of a printer module in accordance with the invention.

Referring to FIG. 3, in the preferred embodiment, the printer module 100 includes a maintenance assembly 130, a carriage 120, a first ink jet cartridge **110*a* having an array of nozzles 112*a* and a second ink jet cartridge 110*b* having an array of nozzles 112*b*, both of which are separately detachably mounted to the carriage 120 by any conventional means. Those skilled in the art will recognize that a single cartridge of sufficient print length and/or a print head having a remote ink supply may be employed. An outline of the registration ski 262 is shown in phantom (for the sake of clarity) so as to provide an indication of its relationship to the registration shield 250 and the cartridges 110*a* and 110*b***.

The maintenance assembly 130 operates to wipe and cap the cartridges **110*a* and 110*b* in conventional fashion and includes a pair of wiper blades 132*a* and 132*b* and an associated pair of caps 134*a* and 134*b*. Each corresponding to the arrays of nozzles 112*a* and 112*b*, respectively. When the carriage 120 is in the maintenance position, the maintenance assembly 130 can be actuated so that wiper blade 132***a* swabs the array of nozzles 112*a* so as to remove any excess ink from the face plate of the array of nozzles 112*a*.

Those skilled in the art will understand that the printer module 100 further includes appropriate systems for bringing the cartridges 110*a* and 110*b* into operative engagement with the maintenance assembly 130 and for repositioning the carriage 120 in the direction indicated by double sided arrow B between a home position in engagement with the maintenance assembly 130 and a print position. In the print position, the cartridges 110*a* and 110*b* are located over the registration shield 250 so as to print on the envelope 20.

Figure 4A:
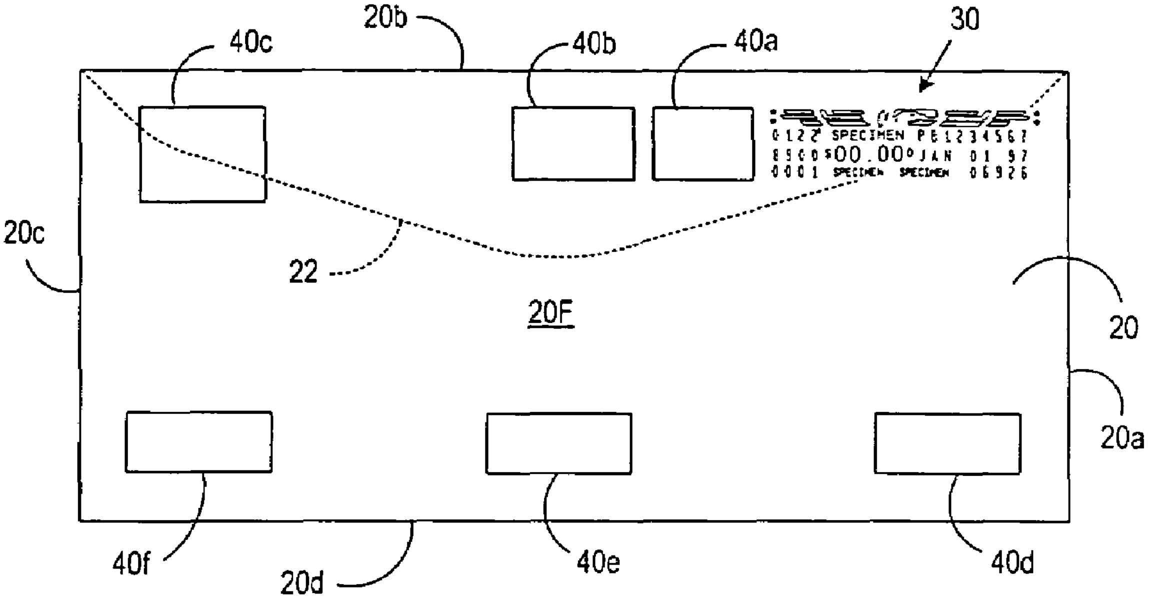
FIG. 4A is a front view of an envelope.
Figure 4B:
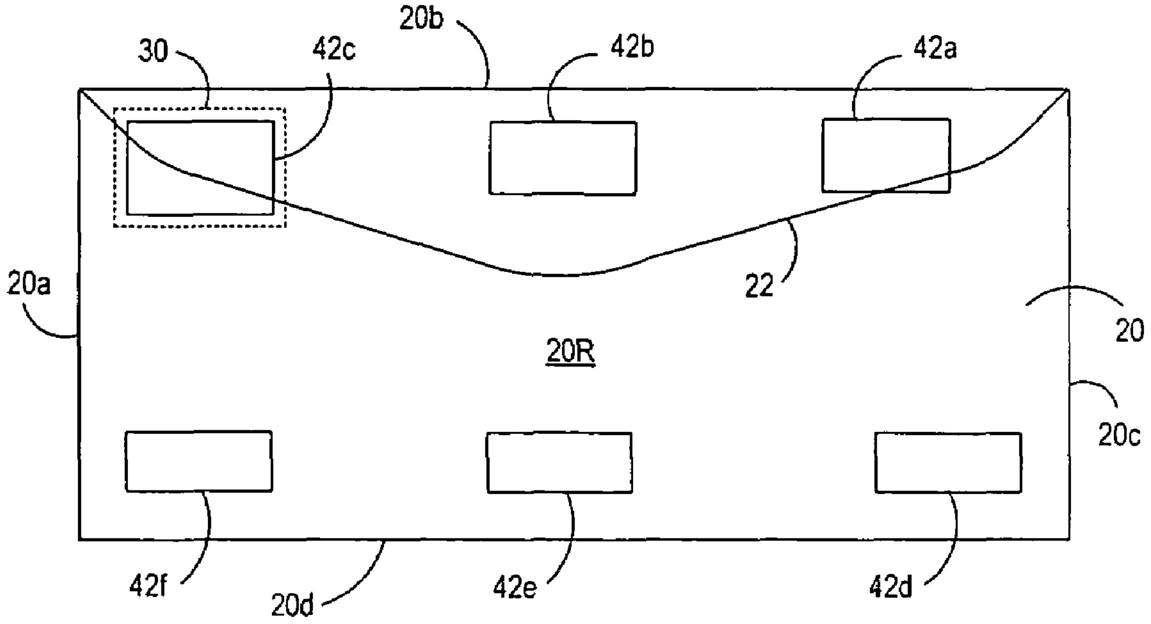
FIG. 4B is a rear view of an envelope.
Figure 4C:
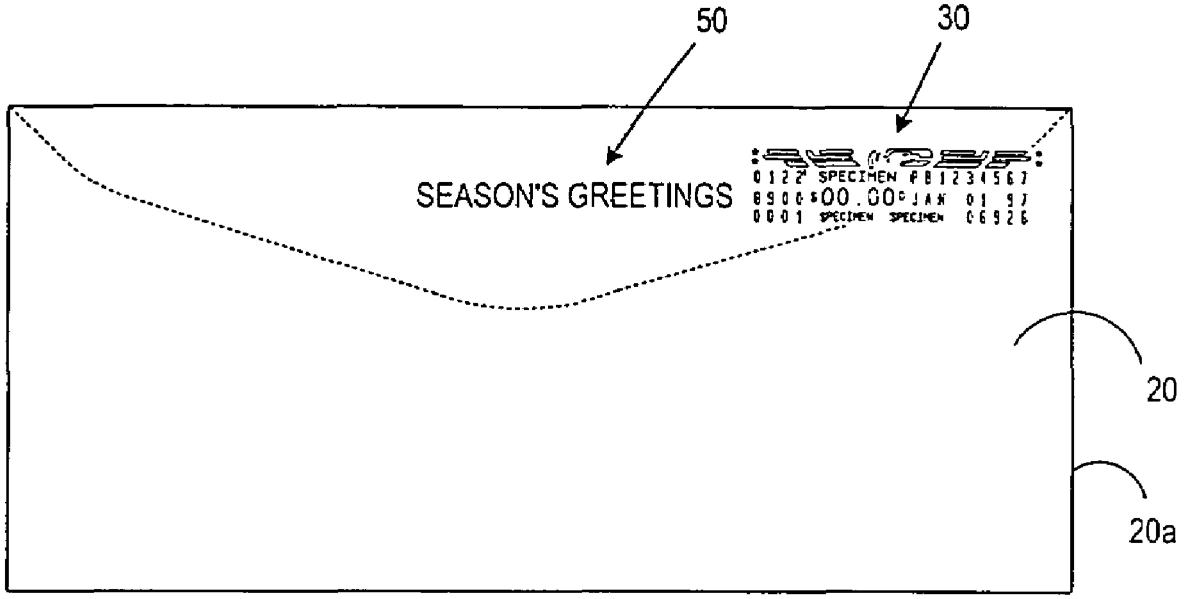
FIG. 4C is a front view of an envelope having a postal indicia and an ad slogan printed thereon in accordance with the present invention.

Referring to FIGS. 4A, 4B and 4C, an envelope 20 having an example of a postal indicia 30 printed thereon is shown. Items that are hidden from view are shown in phantom lines to facilitate understanding of the views. The envelope 20 includes a main body, having a front face 20F and a rear face 20R, and a flap 22. The postal indicia 30 is printed in the upper right hand corner of the envelope's front face 20F as required by most postal authorities. Furthermore, the envelope 20 has a plurality of edges, including a lead edge 20*a*, a top edge 20*b*, a trail edge 20*c* and a bottom edge 20*d*. In conventional fashion, the envelope 20 may include a sender or return address (not shown) in the upper left hand corner of the envelope's front face 20F and a recipient address (not shown) located somewhat centrally on the envelpe's front face 20F.

However, that portion of the envelope 20 that is not occupied by the postal indicia 30 or regulated by the postal authority is available for printing of messages. On the envelope's front face 20F, a plurality of print locations 40*a*-40*f* exist. A first set of front face print locations 40*a*-40*c* are aligned along the top edge 20*b* of the envelope 20; the print location 40*a* is adjacent to the postal indicia 30; the print location 40*b* is center justified over the length of the envelope 20; and the print location 40*c* is left justified with respect to the trailing edge 20*c* of the envelope 20. A second set of front face print locations 40*d*-40*f* are aligned along the bottom edge 20*d* of the envelope 20, the print location 40*d* is right justified with respect to the leading edge 20*a* of the envelope 20; the print location 40*e* is center justified over the length of the envelope 20; and the print location 40*f* is left justified with respect to the trailing edge 20*c* of the envelope 20. On the envelope's rear face 20F, a plurality of print locations 42*a*-42*f* exist. A first set of rear face print locations 42*a*-42*c* are aligned along the top edge 20*b* of the envelope 20; the print location 42*a* is right justified with respect to the trailing edge 20*c* of the envelope 20; the print location 42*b* is center justified over the length of the envelope 20; and the print location 42*c* is left justified with respect to the leading edge 20*a* of the envelope 20. A second set of rear face print locations 42*d*-42*f* are aligned along the bottom edge 20*d* of the envelope 20, the print location 42*d* is right justified with respect to the trailing edge 20*c* of the envelope 20; the print location 42*e* is center justified over the length of the envelope 20; and the print location 42*f* is left justified with respect to the leading edge 20*a* of the envelope 20.

Figure 5:
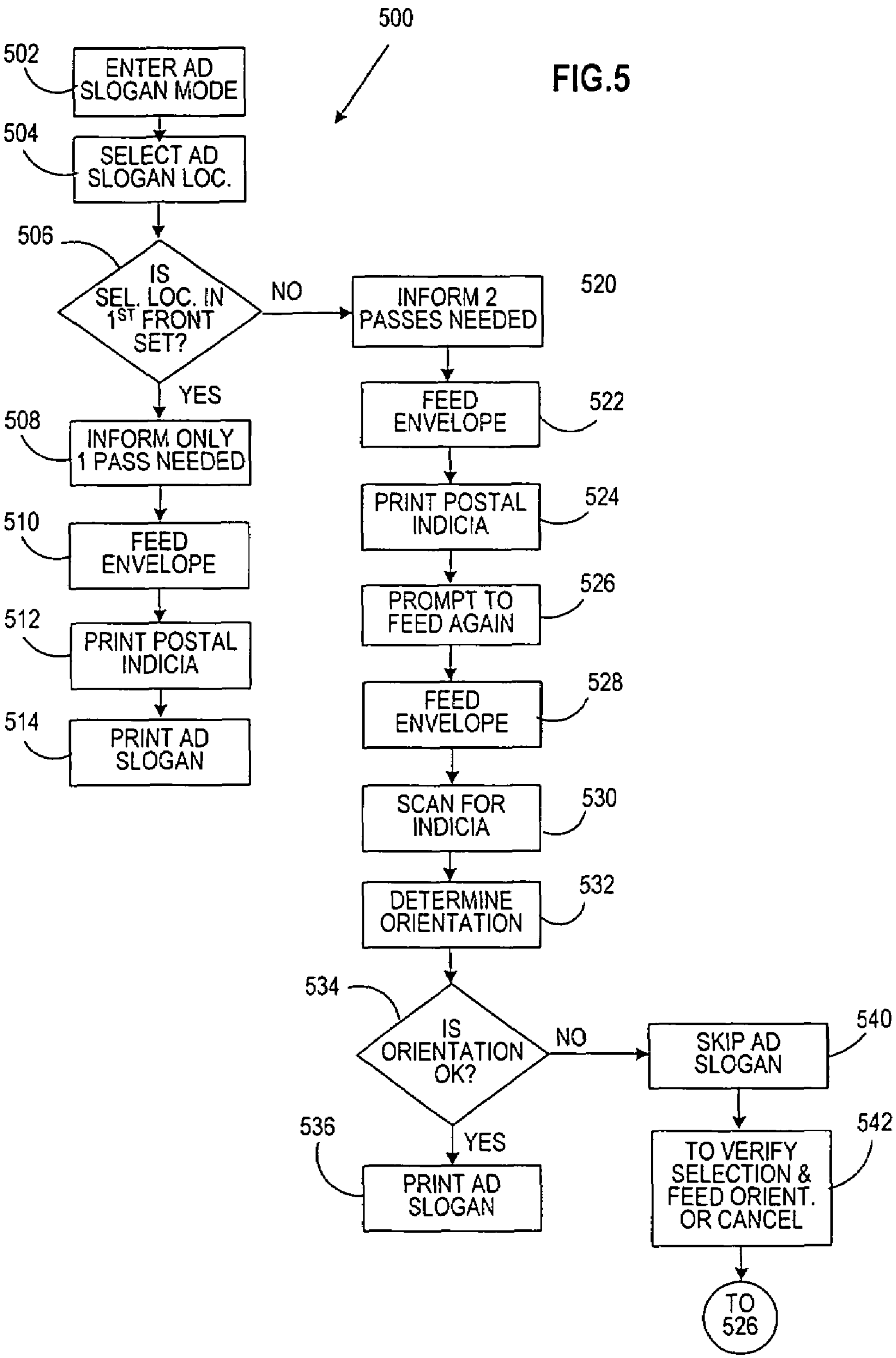
FIG. 5 is a flow chart showing the operation of the postage printing system in accordance with the present invention.

With the structure of the postage printing system 10 described as above, the operational characteristics will now be described with respect to processing an envelope 20 where a postal indicia and an ad slogan 50 are printed thereon. Referring primarily to FIG. 5 while referencing the structure of FIGS. 1, 2, 3, 4A, 4B and 4C a flow chart of a control system algorithm 500 in accordance with the present invention is shown. The algorithm 500 may be executed by any suitable combination of software, firmware and hardware subsystems by the micro control system 300. At 502, the postage printing system 10 enters ad slogan printing mode in response to an appropriate input from the operator via the user interface 380. Next, at 504, the operator indicates a selected one of the plurality of print locations 40*a*-40*f* and 42*a*-42*f* for the ad slogan 50. This is most effectively accomplished by having the display 384 provide the operator with a graphical representation of the plurality of print locations 40*a*-40*f* and 42*a*-42*f* with respect to the postal indicia 30 and having the operator make a selection using the keypad 382.

Next, at 506, a determination is made if the selected print location is within the first set of front face print locations 40*a*-40*c*. If yes, then at 508, the postage printing system 10 informs the operator that only one pass through the postage printing system 10 is required and to commence feeding the envelope 20 when ready. Next, at 510, the envelope 20 is fed through the postage printing system 10 as described above. Next, at 512, the postal indicia 30 is printed on the envelope 20. Using the sensor module 350, the postage printing system 10 detects a front running edge (the edge further downstream in the path of travel) of the envelope 20. So as to print the postal indicia 30, the front running edge is the lead edge 20*a* of the envelope 20. The postage printing system 10 via the micro control system 300 coordinates operation of the printer module 100 with the conveyor apparatus 200 so that the postal indicia 30 is properly printed in proximity to the lead edge 20*a* of the envelope 20. Next, at 514, the ad slogan 50 is printed on the envelope in the selected print location that is one of print locations 40*a*, 40*b* and 40*c*. For print location 40*a*, the postage printing system 10 commencing printing of the ad slogan 50 once printing of the postal indicia 30 is completed. For print locations 40*b* and 40*c*, the postage printing system 10 uses the sensor module 350 to detect the lead edge 20*a* (front running) and the trail edge 20*c* (lagging) of the envelope 20. From this information, the postage printing system 10 knows the length of the envelope 20 and can coordinate operation of the printer module 100 with the conveyor apparatus 200 accordingly so that the postal indicia 30 is properly printed in the selected location.

On the other hand, if at 506 the answer is no, then at 520 the postage printing system 10 informs the operator via the user interface 380 that two (2) passes through the postage printing system 10 are required and that postage printing will occur first. Next, at 522, the operator feeds the envelope 20 through the postage printing system 10 as described above. Next, at 524, the postal indicia 30 is printed on the envelope 20 in proximity to the lead edge 20*a* of the envelope 20 as described above. Next, at 526, the postage printing system 10 prompts the operation via the user interface 380 to feed the envelope 20 one more time. Preferably, to assist in avoiding operator error, the display 384 provides the operator with a graphical representation of the orientation at which the envelope 20 should be fed so as to be able to comply with the printing the ad slogan 50 at the selected location. For example, the graphical representation may include the registration wall, an arrow indicating the direction of the path of travel, and an envelope having the postal indicia 30 shown thereon. If the front face 20F of the envelope 20 is to be fed facing up, then the flap 22 is not shown. On the other hand, if the rear face 20R of the envelope is to be fed facing up, then the flap 22 is shown and the postal indicia 30 may be shown in phantom or dim lines. Next, at 528, the envelope 20 is fed in the path of travel past the sensor module 350 and the scanner module 550. As describe above, the sensor module 350 detects the front running edge (which may be either the lead edge 20*a* or the trail edge 20*c* depending upon the orientation at which the envelope 20 was fed) of the envelope 20. Next, at 530, the scanner module 550 activates the first scanner 552 and a second scanner 554 to detect the postal indicia 30. Next, at 532, the postage printing system 10 determines the feed orientation of the envelope 20. This is achieved by the following. Whether the postal indicia 30 is detected by the first scanner 552 or the second scanner 554 informs the postage printing system 10 whether the envelope 20 was fed with the front face 20F up or down. Also, using the detected position of the postal indicia 30 with respect to the front running edge of the envelope 20 informs the postage printing system 10 whether the lead edge 20*a* or the trail edge 20*c* is further down stream. Thus, the postage printing system 10 may determine the fed orientation of the envelope 20. Next, at 534, a determination is made whether or not the feed orientation corresponds to an anticipated orientation that is based upon the selected print location for the ad slogan. If yes, then at 536 the ad slogan 50 is printed on the envelope 20, using analogous techniques to those described above, in the selected print location that is one of print locations 40*d*, 40*e*, 40*f*, 42*a*, 42*b*, 42*c*, 42*d*, 42*e* and 42*f* based upon the input from the operation. For print locations 40*d*, 40*e*, 40*f*, 42*d*, 42*e* and 42*f*, the envelope 20 is fed so that the bottom edge 20*d* is aligned with the registration wall 12. As a result, the graphics associated with the ad slogan 50 will be printed upside down so that when the envelope 20 is viewed by the intended recipient, the ad slogan in these positions will appear right side up.

On the other hand, if at 534 the answer is no, then at 540 the postage printing system 10 the elects not to print the ad slogan 50 and the envelope 20 is fed out of the postage printing system 10. Next, at 542, the postage printing system 10 prompts the operator to verify the selected print location and the fed orientation or cancel ad slogan printing. At this point, the operator may be given an opportunity to change the selected print location. If the operator does not cancel ad slogan printing and the operator elects to continue, then the algorithm 500 proceeds to 526 for another attempt at printing the ad slogan 50.

Based on the above description and the associated drawings, it should now be apparent that the present invention provides a solution to increasing ad slogan printing flexibility by providing increased locations where ad slogans may be printed while not: (i) adding expense to the printer module 100 by including a longer print head array that covers the entire height of the envelope 20; or (ii) adding expense and complexity to the printer module 100 by having the carriage 120 reposition relative to the registration wall 12 so as to print in the print locations along the bottom edge 20*d* of the envelope 20.

Many features of the preferred embodiment represent design choices selected to best exploit the inventive concept as implemented in a particular postage printing environment. However, those skilled in the art will recognize that various modifications can be made without departing from the spirit of the present invention. For example, the postage printing system 10 may employ an ad slogan only printing mode for those occasions where there is no need to print postage, such as when using pre-printed envelopes with permit based forms of postal payment or when postage is not required (inter company delivery). As another example, the system above has been described with respect to processing a single envelope 20. However, it should be appreciated that the envelopes 20 may be processed in batch mode as is typically done in a mailing machine environment. As yet another example, the scanner module 550 need not be employed at all. However, the result would be an increased risk of operator error. As yet still another example, the scanner module 550 could scan for some other distinguishing characteristic of the envelope 20 instead of the indicia 30, such as the envelope flap 22. As a further example, the ad slogan 50 could be printed first. In this way, if an error occurred and the envelope 20 had to be destroyed, no postage would be lost. As a still further example, the printer module 100 may employ any suitable print technology, such as: wire matrix, thermal transfer, laser and the like. As yet still a further example, the print locations 40*a*-40*f* and 42*a*-42*f* are merely illustrative. Those skilled in the art will recognize that any location along the top edge 20*b* and bottom edge 20*d* may be designated by the operator.

The examples listed above are not intended to be exhaustive of the types of modifications to the preferred embodiments that will readily occur to those skilled in the art, but are in stead are merely illustrative. Therefore, the inventive concepts of the present invention in their broader aspects are not limited to the specific details of the preferred embodiments described above, but are defined by the appended claims and their equivalents.

What is claimed is:

1. A postage printing system, comprising:

a registration wall;

a transport device for feeding an envelope having a plurality of lateral edges in a path of travel through the postage printing system where one of the plurality of lateral edges is aligned with the registration wall;

a printer capable of printing a postal indicia and an ad slogan on the envelope, the printer being located in proximity to the path of travel so as to define a print position;

a control system in operative communication with the transport device and the printer, the control system for:

obtaining an indication from an operator of a selected print location for the ad slogan; and determining if the postal indicia and the ad slogan may be printed in a single physical pass of the envelope through the print position of the path of travel postage printing system, wherein:

if the control system determines that the postal indicia and the ad slogan cannot be printed in a single pass through the postage printing system, then the postal indicia is printed in one pass through the postage printing system and the ad slogan is printed in another pass through the postage printing system, and before the another pass through the postage printing system, the control system provides the operator with an indication of an anticipated orientation of feeding the envelope through the postage printing system based upon the selected print location, further comprising:

a scanner for detecting a distinguishing characteristic of the envelope; and wherein:

during the another pass, the control system is further for:

using the distinguishing characteristic to determine a fed orientation of the envelope;

comparing the fed orientation with the anticipated orientation; and bypassing printing of the ad slogan if the fed orientation and the anticipated orientation do not correspond.

2. The postage printing system of claim 1, wherein:

the one pass occurs prior to the another pass; and the distinguishing characteristic of the envelope is the postal indicia.

3. The postage printing system of claim 2, wherein:

the postal indicia is printed along a top edge of the envelope; and if the selected print location is along a bottom edge of the envelope, then the control system prints the ad slogan upside down so that the postal indicia and the ad slogan both read right side up when the envelope is viewed properly.

4. A postage printing system, comprising:

a registration wall;

a transport device for feeding an envelope having a plurality of lateral edges in a path of travel through the postage printing system where one of the plurality of lateral edges is aligned with the registration wall;

a printer capable of printing a postal indicia and an ad slogan on the envelope, the printer being located in proximity to the path of travel so as to define a print position;

a control system in operative communication with the transport device and the printer, the control system for:

causing the postal indicia to be printed in one physical pass through the path of travel of the postage printing system and the ad slogan to be printed in another physical pass through the path of travel of the postage printing system; and before the another physical pass through the path of travel of the postage printing system, providing the operator with an indication of an anticipated orientation of feeding the envelope through the postage printing system based upon a selected print location, further comprising:

a scanner for detecting a distinguishing characteristic of the envelope; and wherein:

during the another pass, the control system is further for:

using the distinguishing characteristic to determine a fed orientation of the envelope;

comparing the fed orientation with the anticipated orientation; and bypassing printing of the ad slogan if the fed orientation and the anticipated orientation do not correspond.

5. The postage printing system of claim 4, wherein:

the one pass occurs prior to the another pass; and the distinguishing characteristic of the envelope is the postal indicia.

6. The postage printing system of claim 5, wherein:

the postal indicia is printed along a top edge of the envelope; and if the selected print location is along a bottom edge of the envelope, then the control system prints the ad slogan upside down so that the postal indicia and the ad slogan both read right side up when the envelope is viewed properly.

7. A method of operating a postage printing system, the method comprising:

feeding an envelope having a plurality of lateral edges in a path of travel through the postage printing system and along a registration wall where one of the plurality of lateral edges is aligned with the registration wall;

defining a print position where a postal indicia and an ad slogan may be printed on the envelope;

obtaining an indication from an operator of a selected print location for the ad slogan; and determining if the postal indicia and the ad slogan may be printed in a single physical pass through the print position of the path of travel of the postage printing system, wherein:

if the postal indicia and the ad slogan cannot be printed in a single pass through the postage printing system, then the postal indicia is printed in one pass through the postage printing system and the ad slogan is printed in another pass through the postage printing system, further comprising:

before the another pass through the postage printing system, providing the operator with an indication of an anticipated orientation of feeding the envelope through the postage printing system based upon the selected print location, further comprising the step(s) of:

detecting a distinguishing characteristic of the envelope; and during the another pass:

determining a fed orientation of the envelope based on detecting the distinguishing characteristic;

comparing the fed orientation with the anticipated orientation; and bypassing printing of the ad slogan if the fed orientation and the anticipated orientation do not correspond.

8. The method of claim 7, wherein:

the one pass occurs prior to the another pass; and the distinguishing characteristic of the envelope is the postal indicia.

9. The method of claim 8, wherein:

the postal indicia is printed along a top edge of the envelope; and further comprising the step(s) of:

if the selected print location is along a bottom edge of the envelope, printing the ad slogan upside down so that the postal indicia and the ad slogan both read right side up when the envelope is viewed properly.

10. A method of operating a postage printing system, the method comprising:

feeding an envelope having a plurality of lateral edges in a path of travel through the postage printing system and along a registration wall where one of the plurality of lateral edges is aligned with the registration wall;

defining a print position where a postal indicia and an ad slogan may be printed on the envelope;

obtaining an indication from an operator of a selected print location for the ad slogan; and determining if the postal indicia and the ad slogan may be printed in a single physical pass through the print position of the path of travel of the postage printing system, wherein:

if the postal indicia and the ad slogan cannot be printed in a single pass through the postage printing system, then the postal indicia is printed in one pass through the postage printing system and the ad slogan is printed in another pass through the postage printing system, further comprising the step(s) of:

detecting a distinguishing characteristic of the envelope; and during the another pass:

determining a fed orientation of the envelope based on detecting the distinguishing characteristic;

comparing the fed orientation with an anticipated orientation; and bypassing printing of the ad slogan if the fed orientation and the anticipated orientation do not correspond.

11. The method of claim 10, wherein:

the one pass occurs prior to the another pass; and the distinguishing characteristic of the envelope is the postal indicia.

12. The method of claim 11, wherein:

the postal indicia is printed along a top edge of the envelope; and further comprising the step(s) of:

if the selected print location is along a bottom edge of the envelope, printing the ad slogan upside down so that the postal indicia and the ad slogan both read right side up when the envelope is viewed properly.

13. A method of operating a postage printing system, the method comprising the step(s) of:

feeding an envelope having a plurality of lateral edges in a path of travel through the postage printing system and along a registration wall where one of the plurality of lateral edges is aligned with the registration wall;

defining a print position where a postal indicia and an ad slogan may be printed on the envelope;

causing the postal indicia to be printed in one physical pass through the path of travel of the postage printing system and the ad slogan to be printed in another physical pass through the path of travel of the postage printing system; and before the another pass through the postage printing system, providing the operator with an indication of an anticipated orientation of feeding the envelope through the postage printing system based upon a selected print location, further comprising the step(s) of:

detecting a distinguishing characteristic of the envelope; and during the another pass:

determining a fed orientation of the envelope based on detecting the distinguishing characteristic;

comparing the fed orientation with the anticipated orientation; and bypassing printing of the ad slogan if the fed orientation and the anticipated orientation do not correspond.

14. The method of claim 13, wherein:

the one pass occurs prior to the another pass; and the distinguishing characteristic of the envelope is the postal indicia.

15. The method of claim 14, further comprising the step(s) of:

if the selected print location is along a bottom edge of the envelope, printing the ad slogan upside down so that the postal indicia and the ad slogan both read right side up when the envelope is viewed properly.

* * * * *